United States Patent
Schick et al.

(10) Patent No.: US 6,467,748 B1
(45) Date of Patent: Oct. 22, 2002

(54) HYDRAULIC CIRCUIT FOR ACTIVE SUSPENSION SYSTEM

(75) Inventors: Troy Eugene Schick, Cedar Falls, IA (US); Daniel Lee Dufner, Waterloo, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/654,793

(22) Filed: Sep. 5, 2000

(51) Int. Cl.[7] ............................................... F16M 13/00
(52) U.S. Cl. ...................................... 248/550; 267/136
(58) Field of Search ......................... 267/136; 248/550; 180/89.13

(56) References Cited

U.S. PATENT DOCUMENTS

| | | | |
|---|---|---|---|
| 3,233,886 A | 2/1966 | Saffell et al. | |
| 3,701,499 A | 10/1972 | Schubert et al. | 244/17.27 |
| 3,951,373 A | 4/1976 | Swenson et al. | 248/400 |
| 4,198,025 A | 4/1980 | Lowe et al. | 248/550 |
| 4,363,377 A | 12/1982 | Van Gerpen | 180/282 |
| 4,384,700 A * | 5/1983 | Thompson et al. | 248/550 |
| 4,720,085 A * | 1/1988 | Shinbori et al. | 267/64.16 |
| 4,887,699 A * | 12/1989 | Ivers et al. | 188/378 |
| 5,044,455 A * | 9/1991 | Tecco et al. | 180/89.13 |
| 5,105,358 A * | 4/1992 | Takase et al. | 364/424.05 |
| 5,273,297 A * | 12/1993 | Gerdes | 137/625.61 |
| 5,313,389 A * | 5/1994 | Yasui | 364/424.05 |
| 5,810,125 A * | 9/1998 | Gezari | 188/266.2 |
| 5,941,920 A | 8/1999 | Schubert | 701/37 |
| 5,975,508 A | 11/1999 | Beard | 256/136 |
| 6,000,703 A | 12/1999 | Schubert et al. | 280/5.518 |
| 6,371,459 B1 * | 4/2002 | Schick et al. | 267/131 |

FOREIGN PATENT DOCUMENTS

| | | |
|---|---|---|
| DE | 41 20 489 A1 | 12/1992 |
| DE | 42 30 874 A1 | 3/1994 |
| GB | WO-90/02663 * | 3/1990 |
| GB | 2343931 A * | 5/2000 |

OTHER PUBLICATIONS

Grimm, et al., An Active Seat Suspension System For Off–Road Vehicles, Div. of Control Engineering, U of Saskatchewan (date unknown).

McCormac et al., "Dual–Axis Active Seat Suspension System", ASAE Paper No. 89–7542, Dec. 1989.

Ho, et al., "Microprocessor Controlled Active Seat Suspension System For Off–Road Vehicles", National Conference on Fluid Power, 1984.

* cited by examiner

Primary Examiner—Christopher P. Schwartz
Assistant Examiner—Xuan Lan Nguyen

(57) ABSTRACT

An active suspension system for supporting a mass, such as a seat on a base of a vehicle, includes a hydraulic actuator coupled between the seat and the base, an pneumatic off-load device between the seat and the base, and a control system which actively controls the hydraulic actuator and which controls the off-load member. The control system actively controls the hydraulic actuator as a function of a seat position error signal. A flow control valve controls the extension and retraction of the actuator. A proportional pressure control valve is connected between a primary pressure reducing valve and an inlet of the flow control valve. During start up, the pressure control valve prevents the supply of pressurized fluid to the flow control valve until the flow control valve is driven to its center or null position. During an electrical power failure, the solenoid operated pressure control valve is spring driven to a shut off position preventing communication of pressure to the flow control valve.

9 Claims, 4 Drawing Sheets

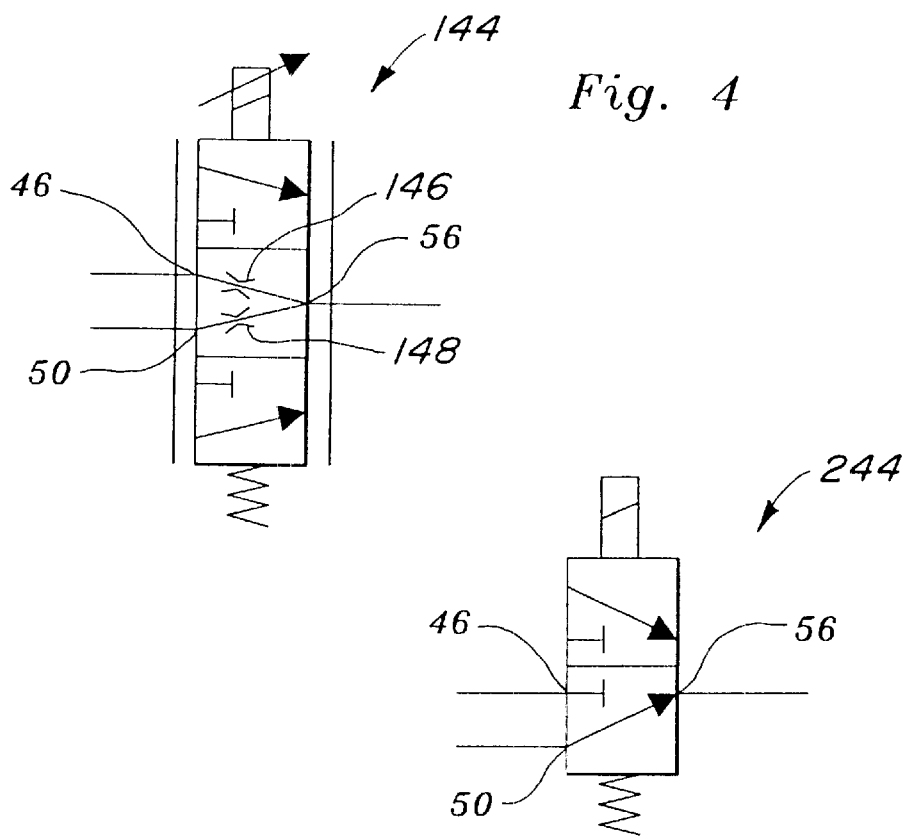
Fig. 4
Fig. 5
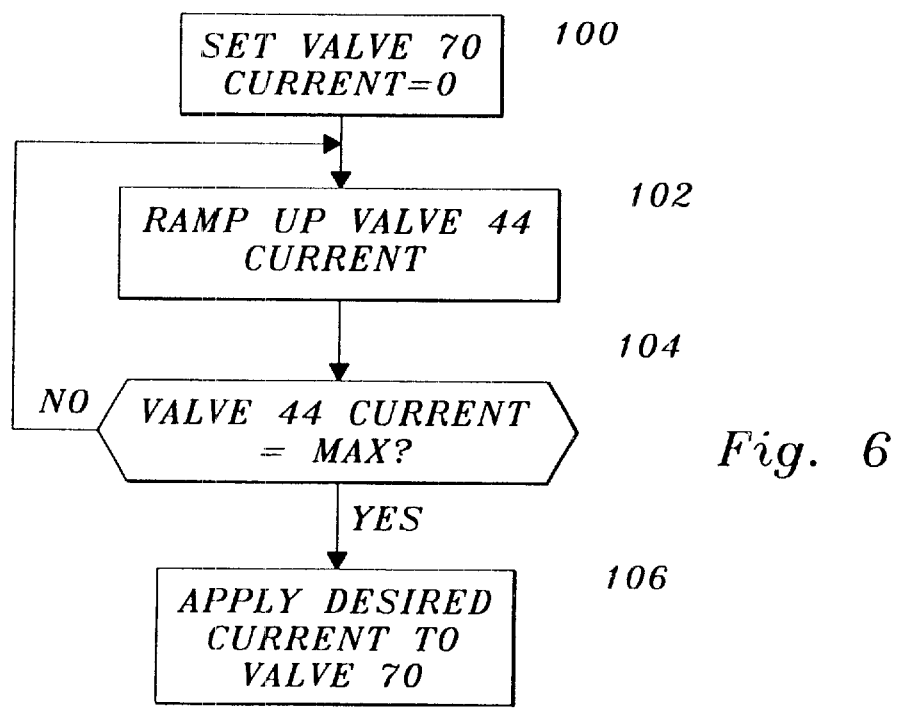
Fig. 6

HYDRAULIC CIRCUIT FOR ACTIVE SUSPENSION SYSTEM

BACKGROUND OF THE INVENTION

The invention relates to a hydraulic circuit, and more particularly, to a hydraulic circuit for an active seat suspension system.

Passive suspension systems, such as for a vehicle seat, are known. For example, John Deere production 6000, 7000, 8000 and 9000 Series tractors have passive seat suspension systems which include a hydraulic shock absorber in parallel with an air bag. Active suspension systems are known which include an electro-hydraulically controlled actuator working in parallel with a resilient device, such as a spring. For example, U.S. Pat. No. 4,363,377 (Van Gerpen), issued Dec. 14, 1982, discloses an active seat suspension system with a hydraulic actuator in parallel with a spring. A control system controls fluid communication to the actuator in response to a seat position signal, a stiffness control, a seat height control and a gain control. U.S. Pat. No. 6,000,703 (Schubert et al.), issued Dec. 14, 1999, discloses an active cab or seat suspension control system with a hydraulic actuator in parallel with a pneumatic air spring or air bag. An active seat suspension system which actively controls the seat isolation with hydraulics and an accelerometer is shown in An Active Seat Suspension System For Off-Road Vehicles, by Grimm, et al. With an electro-hydraulic active position control system, hydraulic interactions may occur at vehicle start up and shut down. At start up, hydraulic pressure can be generated before the electronic control is functioning. If the hydraulic circuit is not blocked when electronic control is enabled, sudden movements in the actuator can result from supply pressure being present prior to the proper positioning of the actuator control valve. In the event of loss of electrical power, electronic positioning control could be lost, resulting in undesired action of the suspension system. Typically, a spool position feedback sensor is used to accurately position the actuator control valve spool upon startup. This adds cost and complexity to the system. Accordingly, it is desirable to have a hydraulic circuit which does not require the use of a spool position feedback sensor.

SUMMARY OF THE INVENTION

Accordingly, an object of this invention is to provide an active suspension system which prevent undesired hydraulic interactions at vehicle start up and shut down.

A further object of the invention is to provide such an active suspension system wherein action of the hydraulic actuator is prevented until electronic control is enabled.

Another object of the invention is to provide an active suspension system which prevents undesired action of the suspension system if electrical power is lost.

Another object of the invention is to provide an active suspension system with a hydraulic circuit which does not require the use of a spool position feedback sensor.

These and other objects are achieved by the present invention, wherein an active suspension system for supporting a mass, such as a seat on a base of a vehicle, includes a hydraulic actuator coupled between the seat and the base, an pneumatic off-load device between the seat and the base, and a control system which actively controls the hydraulic actuator and which controls the off-load member. A flow control valve controls the extension and retraction of the actuator. A proportional pressure control valve is connected between a primary pressure reducing valve and an inlet of the flow control valve. During start up, the pressure control valve prevents the supply of pressurized fluid to the flow control valve until the flow control valve is driven to its center or null position. During an electrical power failure, the solenoid operated pressure control valve is spring driven to a shut off position preventing communication of pressure to the flow control valve.

BRIEF DESCRIPTION OF THE DRAWINGS

FIG. 4 is illustrates an alternate valve which may be used in place of the pressure control valve of FIG. 2; and FIG. 5 illustrates an another alternate valve which may be used in place of the pressure control valve of FIG. 2.

FIG. 6 is a flow chart illustrating a function performed by the electronic control unit of FIG. 1.

DETAILED DESCRIPTION

Figure 1:
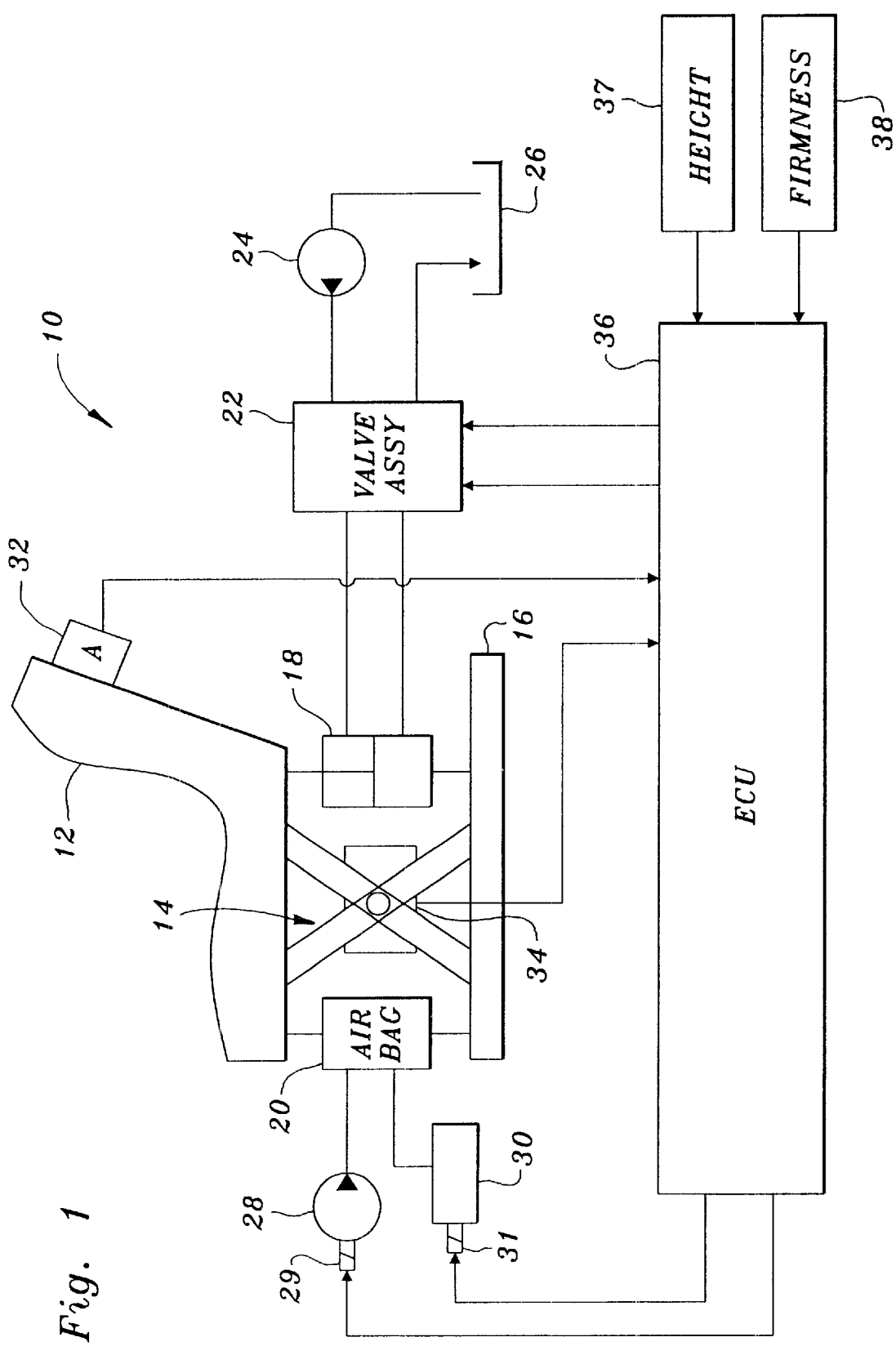
FIG. 1 is a simplified schematic diagram of a seat suspension system according to the present invention.

Referring to FIG. 1, an active seat suspension system 10 includes a seat 12 supported by scissors linkage 14 above a seat base 16. Also coupled between the seat 12 and the base 16 are a hydraulic piston or actuator 18 and an pneumatic device, such as an airbag 20. A hydraulic circuit or valve unit 22 controls fluid communication between the actuator 18, a pump 24 and a reservoir or sump 26. The amount of air in the airbag 20 is controlled by compressor 28 (controlled by solenoid 29) and by vent 30 (controlled by solenoid 31). An accelerometer 32, such as a commercially available silicon capacitive variation transducer, is preferably attached to the seat 12, and a seat position sensor 34, such as a ratio-metric, rotary Hall-effect transducer, is coupled to the linkage 14. An electronic control unit (ECU) 36 receives signals from sensors 32 and 34, from a manually operable height control (raise/lower rocker switch) 37 and from a manually operable firmness control 38. In response to these inputs, the ECU 36 provides control signals to the valve unit 22, the compressor control solenoid and a vent control solenoid.

Figure 2:
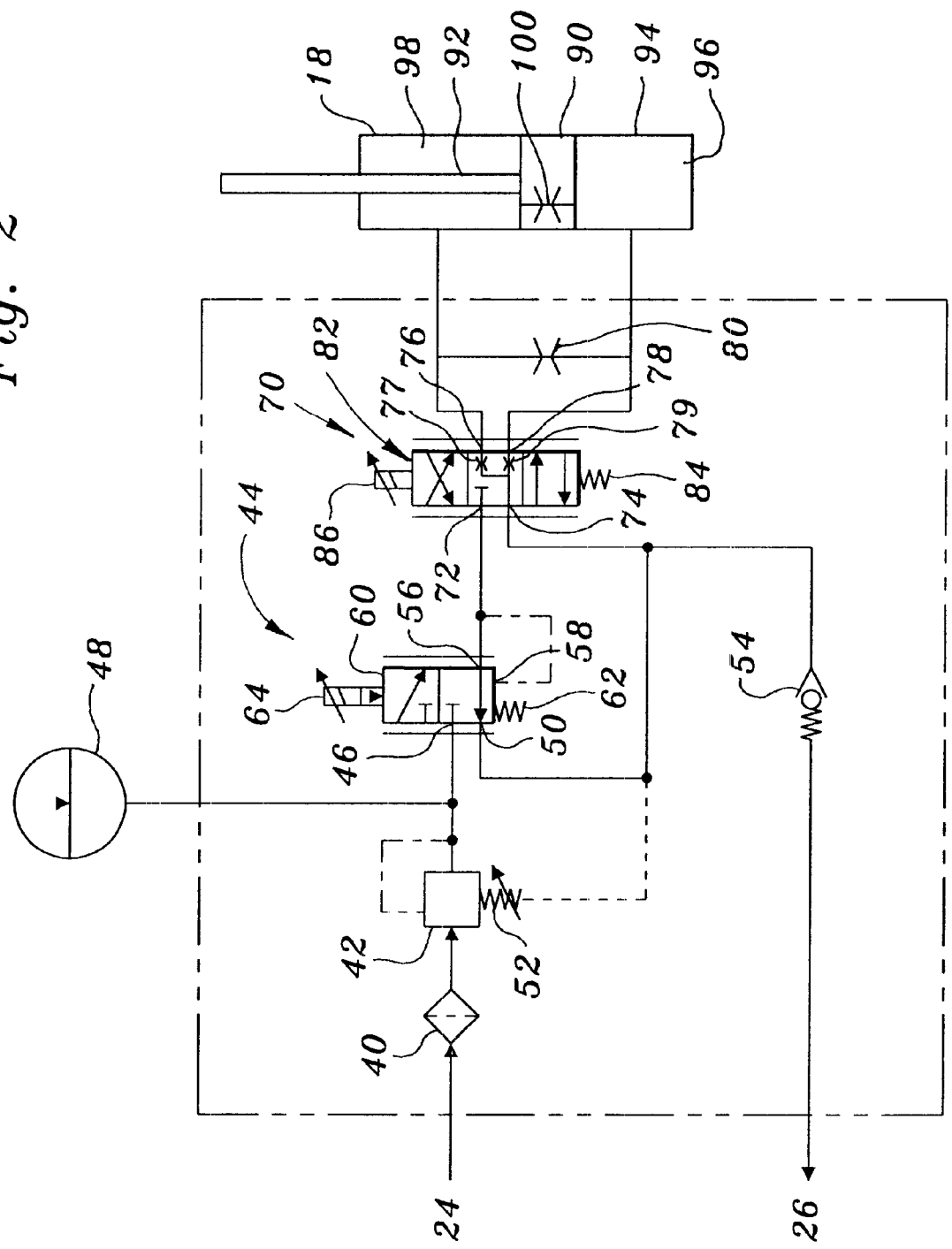
FIG. 2 is a schematic diagram of the hydraulic valve circuit portion of FIG. 1.

As best seen in FIG. 2, the valve unit 22 includes an inlet screen 40 coupled between the pump 24 and a pressure reducing valve 42. A solenoid operated, pilot controlled, 2-position, proportional pressure control valve 44 includes a first port 46, a second port 50 and a third port 56. First port 46 is communicated with an outlet of the pressure reducing valve 42 and with an accumulator 48. Second port 50 is communicated with a pressure control inlet 52 of pressure reducing valve 42, and with sump 26 via a return check valve 54. Third port 56 is communicated with a pressure sensing port 58 of valve 44 and with a proportional flow control valve 70. Valve 44 includes a valve member 60 movable from a first position wherein port 46 is closed and port 50 is communicated to port 56, to a second position wherein port 50 is closed and port 46 is communicated with port 56. A spring 62 urges valve member 60 into its first position. Solenoid 64 may be energized to move valve member 60 into its second position. Alternatively, valve 44 may be a proportional, direct acting valve such as shown in FIG. 4, or a non-proportional direct acting valve such as shown in FIG. 5.

Proportional flow control valve 70 includes a first port 72, a second port 74, a third port 76 and a fourth port 78. Port 72 is communicated with the third port 56 of valve 44. Port 74 is communicated with port 50 of valve 44, and with sump 26 via a return check valve 54. Port 76 is communicated with a first port of actuator 18 and with port 74 via orifice 77. Port 78 is communicated with a second port of actuator 18 and with port 74 via orifice 79. Preferably, an orifice 80 communicates port 76 with port 78. Valve 70 includes a valve member 82 movable from a first position (actuator extension) wherein port 72 is communicated to port 76 and port 78 is communicated with port 74, to a second, center or "float" position wherein port 72 is blocked and ports 76 and 78 are communicated to port 74, and to a third position (actuator retraction) wherein port 72 is communicated to port 78 and port 74 is communicated with port 76. A spring 84 urges valve member 82 into its first position. Solenoid 86 may be energized to move valve member 82 into its second and third positions.

Actuator 18 includes a piston 90 and rod 92 movable within a cylinder 94 and which separates the cylinder into chambers 96 and 98. An orifice passage 100 extends through piston 90 and communicates chamber 96 with chamber 98.

Figure 3:
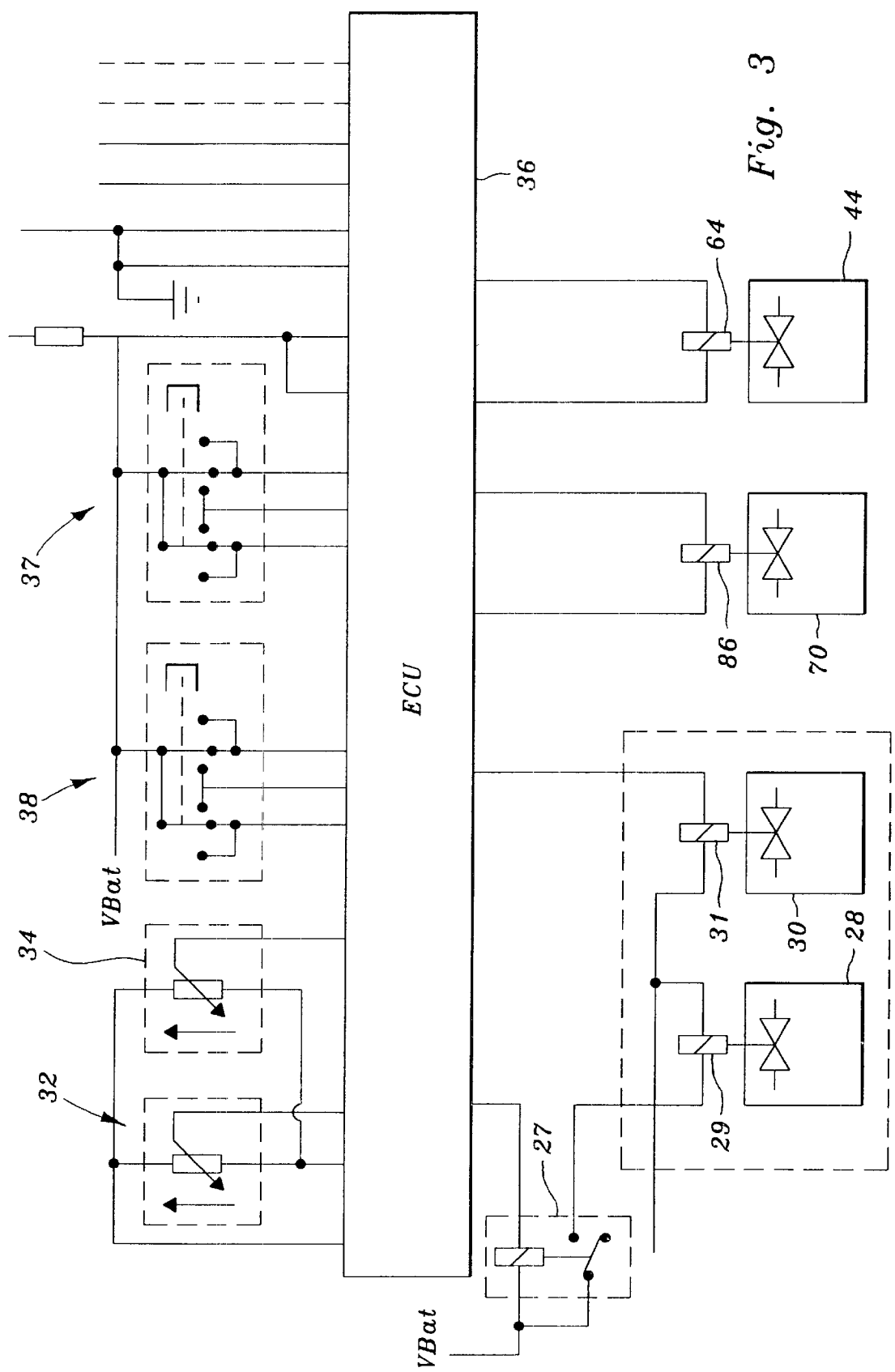
FIG. 3 is an electrical schematic diagram of a of the present invention.

As best seen in FIG. 3, the ECU 36 is connected to the accelerometer 32, the seat position sensor 34, height control 37, firmness control 38, solenoid 64 of valve 44, solenoid 86 of valve 70, solenoid 29 of compressor 28 and solenoid 31 of vent 30. The ECU is preferably programmed so that it functions as described below.

The ECU preferably puts the system in a "hydraulics off" mode by setting to zero the current applied to the pressure control valve 44 and the flow control valve 70. With these valves turned off, the suspension acts as a passive suspension with both sides of actuator 18 connected to sump allowing it to freely float. The "hydraulics off" mode is preferably enabled when the vehicle is stationary, a fault condition exists, a seat lower command is generated by height (raise/lower) control 37, or if the ignition key (not shown) is off.

With reference to FIGS. 2 and 6, when transitioning from the "hydraulics off" mode to an active control mode (raising via control 37 or active isolating), the ECU 36 sets the current to flow control valve 70 at null (step 100) while the command applied to the solenoid 64 of pressure control valve 44 is gradually increased from zero (step 102). This gradual increase in current to pressure control valve 44 provides a gradual and controlled increase in the pressure supplied to flow control valve 70. After this current command has been "ramped up" to a maximum level (step 104), the ECU 36 then (in step 106) adjusts the current to solenoid 86 of flow control valve 70 to move the seat 12 to the desired position. (The ECU 36 could adjust the current to flow control valve 70 prior to the current in pressure control valve 44 reaching the maximum level). The operation of the ECU 36 and a control system associated therewith is further described in co-pending application Ser. No. 09/654,792, which is incorporated by reference herein.

FIG. 4 shows a proportional, direct acting control valve 144 which may be used in place of pressure control valve 44. Valve 144 has a first position wherein port 50 is blocked and port 46 is communicated to port 56, a second position wherein port 56 is communicated with ports 46 and 50 via orifices 146 and 148, respectively, and a third position wherein port 46 is blocked and port 50 is communicated with port 56.

Referring now to FIG. 5, a non-proportional direct acting control valve 244 may be used in place of pressure control valve 44. Valve 244 has a first position wherein port 50 is blocked and port 46 is communicated to port 56, and a second position wherein port 56 is communicated with port 50 and port 46 is blocked.

Referring now to FIG. 5, a non-proportional direct acting control valve 244 may be used in place of pressure control valve 44. Valve 244 has a first position wherein port 50 is blocked and port 46 is communicated to port 56, and a second position wherein port 56 is communicated with port 50 and port 46 is blocked.

While the present invention has been described in conjunction with a specific embodiment, it is understood that many alternatives, modifications and variations will be apparent to those skilled in the art in light of the foregoing description. For example, the present invention is applicable to suspension systems for masses other than seats, such a vehicle cab or chassis. Accordingly, this invention is intended to embrace all such alternatives, modifications and variations which fall within the spirit and scope of the appended claims.

What is claimed is:

1. A suspension system for supporting a mass on a base of a vehicle, comprising:

a source of hydraulic pressure;

a hydraulic reservoir;

a hydraulic actuator coupled between the mass and the base;

a first control valve controlling extension and retraction of the actuator, the first control valve having a first inlet, and having a second inlet communicated with the reservoir;

a second control valve is connected between the source and the first inlet of the first control valve, the second control valve having a valve member movable from a first position wherein communication between the source and the first inlet of the first control valve is closed, to a second position wherein communication between the source and the first control valve is open, the second control valve having a spring biased to urge the valve member into its first position, and having a solenoid energizable to move the valve member out of the first position and into its second position, the second control valve communicating the first inlet of the first control valve to tank; and a control unit operatively coupled to the first control valve and the second control valve, and which actively controls the hydraulic actuator.

2. The suspension system of claim 1, wherein:

the first control valve comprises a flow control valve.

3. The suspension system of claim 1, wherein:

the second control valve comprises a pressure control valve.

4. The suspension system of claim 1, wherein:

the first control valve has a null position closing fluid communication to the actuator.

5. The suspension system of claim 1, wherein:

the second control valve comprises a proportional, solenoid operated, pilot controlled valve.

6. The suspension system of claim 1, further comprising:

at least one orifice coupled to the hydraulic actuator so that hydraulic fluid will flow through the orifice as the hydraulic actuator moves.

7. A suspension system for supporting a mass on a base of a vehicle, comprising:

a source of hydraulic pressure;

a hydraulic reservoir;

a hydraulic actuator coupled between the mass and the base;

a first control valve controlling extension and retraction of the actuator, the first control valve having a first inlet, and having a second inlet communicated with the reservoir;

a second control valve is connected between the source and the first inlet of the first control valve, the second control valve having a valve member movable from a first position wherein communication between the source and the first inlet of the first control valve is closed, to a second position wherein communication between the source and the first control valve is open, the second control valve having a spring biased to urge the valve member into its first position, and having a solenoid energizable to move the valve member out of the first position and into its second position;

a pressure reducing valve connected between the source and an inlet of the second control valve; and a control unit operatively coupled to the first control valve and the second control valve, and which actively controls the hydraulic actuator.

8. The suspension system of claim 7, wherein:

the pressure reducing valve has a pressure control port which is communicated with a port of the second control valve and with a port of the first control valve.

9. A suspension system for supporting a mass on a base of a vehicle, comprising:

a source of hydraulic pressure;

a hydraulic reservoir;

a hydraulic actuator coupled between the mass and the base;

a first control valve controlling extension and retraction of the actuator, the first control valve having a first inlet, and having a second inlet communicated with the reservoir via a check valve which permits fluid flow from the second inlet to the reservoir;

a second control valve is connected between the source and the first inlet of the first control valve, the second control valve having a valve member movable from a first position wherein communication between the source and the first inlet of the first control valve is closed, to a second position wherein communication between the source and the first control valve is open, the second control valve having a spring biased to urge the valve member into its first position, and having a solenoid energizable to move the valve member out of the first position and into its second position; and a control unit operatively coupled to the first control valve and the second control valve, and which actively controls the hydraulic actuator.

* * * * *